Oct. 14, 1930.  L. R. BUCKENDALE  1,778,242

MOTOR VEHICLE

Filed Dec. 12, 1927

INVENTOR:
Lawrence R. Buckendale
by Carnot Carnot Gravely

HIS ATTORNEYS.

Patented Oct. 14, 1930

1,778,242

UNITED STATES PATENT OFFICE

LAURENCE R. BUCKENDALE, OF DETROIT, MICHIGAN, ASSIGNOR TO THE TIMKEN-DETROIT AXLE COMPANY, OF DETROIT, MICHIGAN, A CORPORATION OF OHIO

MOTOR VEHICLE

Application filed December 12, 1927. Serial No. 239,362.

This invention relates to running gears for motor vehicles of the kind having two rear driving axles, and has for its principal object to provide an improved mechanism for neutralizing the torque effects on said axles. Other objects are to provide for simplicity and cheapness of construction and compactness of design. The invention consists in the construction, combinations and arrangements of parts hereinafter described and claimed.

Figure 1:
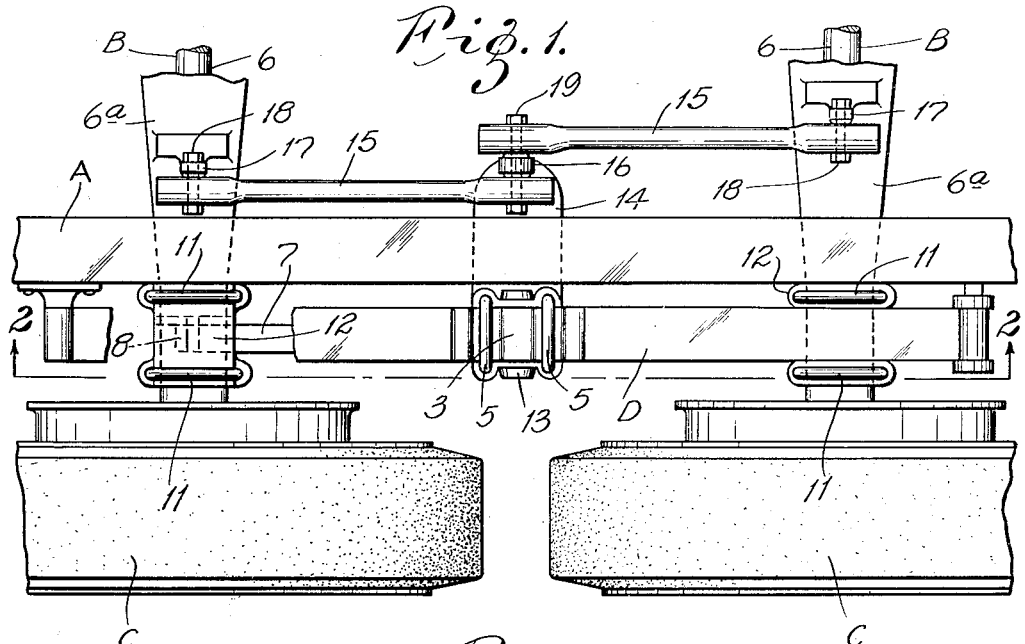
Figure 2:
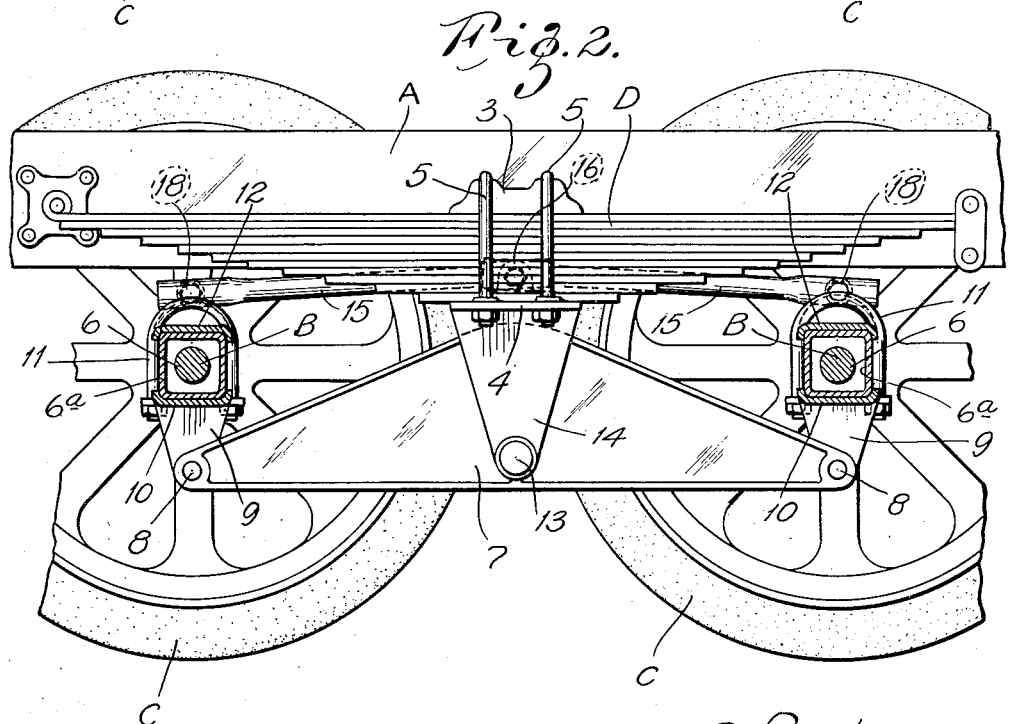

In the accompanying drawing, which forms part of this specification and wherein like symbols refer to like parts wherever they occur, Fig. 1 is a plan of one side of the rear portion of the chassis of a motor vehicle having two spring supporting driving axles provided with a torque neutralizing mechanism embodying my invention; and Fig. 2 is a vertical section on the line 2—2 in Fig. 1.

Referring to the accompanying drawing, my invention is shown in connection with the running gear of a six wheel motor vehicle, of which is shown only the rear portion of one of the longitudinal side bars or frame members A of the vehicle, the adjacent end portions of two rear driving axles B and their wheels C and a semielliptic body supporting leaf spring D, which is located outside said side rail and extends longitudinally thereof above the two driving axles. The forward end of the body supporting spring D is pivoted to the side bar A and its rear end is shackled to said bar; and the leaves of said spring are clamped together intermediate its ends by a suitable clamp comprising top and bottom clamping plates 3 and 4, respectively, and a clamping bolt 5. Each of the rear driving axles comprises shaft sections 6 operatively connected to receive motion from the differential mechanism (not shown) and transmit motion to the traction wheels C, and an axle housing 6ª for enclosing the differential mechanism and the shaft sections. The construction thus far described is well known and it is considered unnecessary to illustrate it in detail.

The two driving axles B are spaced apart longitudinally of the vehicle and are held parallel to each other by a horizontal tie or torque bar 7, which extends from axle to axle beneath each side spring D. The ends of the tie or torque bar 7 extend beneath the respective axles and are pivotally secured to the bottoms of the axle housing 6ª by means of horizontal pivot pins 8 which extend longitudinally of said housings through registering openings provided therefor in the ends of said bar and in lugs 9 depending from clamping plates 10 which are clamped to the bottoms of the housings by means of U-bolts 11 resting on saddles 12 supported on top of said housings. The tie or torque bar 7 is pivotally connected to the spring clip at a point substantially midway of the two driving axles by means of a horizontal pivot pin 13 which is disposed parallel to the pivot pins 8 and extends through registering holes in said bar and in lugs 14 which depend from the lower clamping plate 4 of the spring clip and straddle said bar. By this arrangement the weight of the body of the vehicle is transmitted through the side springs and torque bars to the axle housings and thence to the wheels.

The axle housings are also connected at each end to each other and to the vehicle spring located adjacent thereto by means of torque bars or rods 15, which are disposed above the axle housing and extend longitudinally of the side rail adjacent to the inner side thereof. As shown in the drawing, the bottom plate 4 of the spring clip extends inwardly beneath the side frame member and is provided with an upstanding lug 16 which is located substantially midway of the two axle housings; and likewise, each axle housing is provided at its top with a similar upstanding lug 17. The two torque rods span the space between the two driving axles with one end of each rod pivotally secured to the upstanding lug 17 of an axle housing by means of a horizontal pivot 18 and with the other ends of the two rods disposed one on each side of the lug 16 on the bottom plate of the spring clip in lapping relation and pivotally secured together and to said lug 16 by means of a single horizontal pivot 19. As shown in the drawing, the pivots which connect the upper torque rods to the axle housing and to the spring clip are disposed parallel to the pivots which connect the lower torque bar to said axle housing and said spring clip.

By the arrangement described, the housings of the two driving axles are linked together both above and below said axles by the upper and lower torque members which operate after the manner of parallel links to force the two axles to move longitudinally of the vehicle in the same plane. Said torque members also maintain a proper spacing of the two axles and keep them in parallel alinement. The torque members also resist the tendency for the axle housings to turn on their axes due to driving, braking or traction strains thereon by transmitting these torque strains directly to the springs to be absorbed thereby. The torque mechanism, due to its pivotal connection with the axle housings and the spring, also has sufficient flexibility to enable the wheels to accommodate themselves to rough or uneven roads.

Obviously, the hereinbefore described torque neutralizing mechanism admits of considerable modification without departing from the invention, and I do not wish to be limited to the precise arrangement shown and described. For instance, it may be desirable to give some cushioning effect to the driving axles by making the torque bar or rods extensible between their pivotal connections with the axle housings.

What I claim is:

1. A motor vehicle comprising two driving axles provided with housings, a side frame member extending longitudinally of the vehicle at each end of said housings, a spring secured to said side frame member, torque members located above and below said housings and connecting the same, and means for connecting the upper and lower torque members to said spring.

2. A motor vehicle comprising two driving axles provided with housings, a side frame member extending longitudinally of the vehicle at each end of said housings, a spring secured to said side frame member and spanning the space between said housings, torque members located above and below said housings and connecting the same, and means for pivotally connecting both the upper and lower torque members to said spring.

3. A motor vehicle comprising two driving axles provided with housings and a frame member located above each end of said housings, a spring secured to said frame member on each side of the vehicle, members linking together said housings at the top and bottom thereof on each side of the vehicle, and means for pivotally connecting both the top and bottom members on each side to the adjacent side springs.

4. A motor vehicle comprising two driving axles provided with housings, a side frame member extending longitudinally of the vehicle at each end of said housings, a spring secured to said side frame member and spanning the space between said driving axles, link connections located above and below said housings and connecting the same, and means for pivotally connecting the upper and lower link connections to said spring, the pivotal connections between the upper and lower link connections and said springs being located substantially midway of the axle housings.

5. A motor vehicle comprising two driving axles provided with housings, a side frame member extending longitudinally of the vehicle at each end of said housings, a spring secured to said side frame member, and link connections between said axle housings at the top and bottom thereof, the upper link connection comprising a pair of links connected together and to the upper portions of said housings and to said spring at their point of connection with each other.

6. A motor vehicle comprising two driving axles provided with housings, a side frame member extending longitudinally of the vehicle at each end of said housings, a spring secured to said side frame member, and link connections connecting said housings above and below their axes, the upper connection comprising a pair of links pivotally connected to each other and to the upper portions of said housings and to said spring at their point of connection with each other, and the lower link connection comprising a single bar pivotally connected to the lower portions of said housings and to said spring.

7. A motor vehicle comprising two driving axles provided with housings, a side frame member extending longitudinally of the vehicle at each end of said housings, a leaf spring extending longitudinally of said side frame member with its ends secured thereto, torque members located above and below said housings and connecting the same, and means for connecting said torque members to said spring, the connections between said torque members and said spring being located substantially midway of the axle housing.

8. A motor vehicle comprising two driving axles provided with housings, a side frame member extending longitudinally of the vehicle at each end of said housings, a leaf spring extending longitudinally of said side frame above said axle with its ends secured to said frame member, torque members located above and below said housings and connecting the same, a spring clip for holding the leaves of said spring together, and means for connecting the upper and lower torque members to said spring clip.

9. A motor vehicle comprising two driving axles provided with housings, a side frame member extending longitudinally of the vehicle at each end of said housings, a leaf spring extending longitudinally of said side frame member above said axles with its ends pivotally secured to said member, torque members located above and below said housings and connecting the same, a clip for holding the leaves of said springs together, and means for connecting the upper and lower torque members to said spring clip, the torque member located in one plane comprising a single member extending from axle housing to axle housing, and the torque members in the other plane comprising two members connected at one end to an axle housing and at the other end to each other and to said spring clip.

10. A motor vehicle comprising two driving axles provided with housings, a side frame member extending longitudinally of the vehicle at each end of said housings, a leaf spring secured to said side frame member and spanning the space between said axle housings, torque members extending from axle housing to axle housing above and below the same and pivotally connected thereto, a spring clip mounted on said spring intermediate said axles, and means for pivotally connecting said upper and lower torque members to said spring clip.

11. A motor vehicle comprising two driving axles provided with housings, a side frame member extending longitudinally of the vehicle at each end of said housings, a leaf spring secured to said side frame member and spanning the space between said axle housings, torque members extending from axle housing to axle housing above and below the same and pivotally connected thereto, a spring clip mounted on said spring intermediate said axles, and means for pivotally connecting said upper and lower torque members to said spring clip, the lower torque member comprising a single bar and the upper torque member comprising two links secured at one end to an axle housing and at the other end to each other and to said spring clip.

12. A motor vehicle comprising two axles, a frame member above said axles, torque members extending from axle to axle above and below the same and pivotally connected thereto, a bracket supported on the lower torque member, and means connecting the bracket to the frame member of the vehicle, the upper torque member comprising two links secured at one end to an axle and at the other end to said bracket.

Signed at Detroit, Michigan, this 7th day of December, 1927.

LAURENCE R. BUCKENDALE.